US010825258B1

(12) United States Patent
Smet et al.

(10) Patent No.: US 10,825,258 B1
(45) Date of Patent: Nov. 3, 2020

(54) SYSTEMS AND METHODS FOR GRAPH-BASED DESIGN OF AUGMENTED-REALITY EFFECTS

(71) Applicant: Facebook, Inc., Menlo Park, CA (US)

(72) Inventors: Stef Marc Smet, London (GB); Thomas Paul Mann, London (GB); Michael Slater, Nottingham (GB); Hannes Luc Herman Verlinde, London (GB)

(73) Assignee: Facebook, Inc., Menlo Park, CA (US)

( * ) Notice: Subject to any disclaimer, the term of this patent is extended or adjusted under 35 U.S.C. 154(b) by 77 days.

(21) Appl. No.: 16/147,358

(22) Filed: Sep. 28, 2018

(51) Int. Cl.
*G06T 19/20* (2011.01)
*G06T 11/20* (2006.01)
*G06T 19/00* (2011.01)
*G06K 9/00* (2006.01)
*G06T 13/20* (2011.01)
*G06T 7/70* (2017.01)

(52) U.S. Cl.
CPC ............ *G06T 19/20* (2013.01); *G06T 11/206* (2013.01); *G06T 19/006* (2013.01); *G06K 9/00228* (2013.01); *G06K 9/00335* (2013.01); *G06K 9/00375* (2013.01); *G06K 9/00624* (2013.01); *G06T 7/70* (2017.01); *G06T 13/20* (2013.01); *G06T 2200/24* (2013.01); *G06T 2207/20072* (2013.01); *G06T 2210/61* (2013.01); *G06T 2219/2016* (2013.01)

(58) Field of Classification Search
CPC . G06F 3/048; G06F 16/9024; G06K 9/00288; G06K 9/00355; G06K 9/00624; G06K 9/00375; G06K 9/469; G06T 19/20; G06T 15/005; G06T 11/206; G06T 19/00; G06T 19/006; G06T 7/70; G06T 13/20; G06T 2200/24; G06T 2207/20072; G06T 2210/61; G06T 2219/2016
See application file for complete search history.

(56) References Cited

U.S. PATENT DOCUMENTS

| | | | |
|---|---|---|---|
| 2009/0085918 A1* | 4/2009 | Hollingworth | G06T 3/40 345/475 |
| 2014/0225924 A1* | 8/2014 | Loxam | G06T 19/006 345/633 |
| 2014/0267309 A1* | 9/2014 | Wilson | G06T 13/00 345/473 |

\* cited by examiner

*Primary Examiner* — Haixia Du
(74) *Attorney, Agent, or Firm* — Baker Botts L.L.P.

(57) ABSTRACT

In one embodiment, a method includes by a computing device, displaying a user interface for designing augmented-reality effects. The method includes receiving user input through the user interface. The method includes displaying a graph generated based on the user input. The graph may include multiple nodes and one or more edges. The nodes may include a detector node and a filter node connected by one or more edges. The method includes detecting, in accordance with an object type specified by the detector node, one or more object instances of the object type appearing in a scene. The method includes selecting, in accordance with at least one criterion specified by the filter node, at least one of the one or more detected object instances that satisfies the criterion. The method includes rendering an augmented-reality effect based on at least the selected object instance.

17 Claims, 12 Drawing Sheets

SYSTEMS AND METHODS FOR GRAPH-BASED DESIGN OF AUGMENTED-REALITY EFFECTS

TECHNICAL FIELD

This disclosure generally relates to the development of computer generated scenes and effects.

BACKGROUND

Augmented reality involves a combination of a real-world scene and computer-generated virtual effects that augment the scene with additional information. Stated differently, augmented reality provides users with a view of the real or physical world with added computer-generated sensory inputs (e.g., visual, audible, etc.). A computing device configured to generate an augmented-reality effect may dynamically add virtual objects, audio and other sensory enhancements to a captured real-world scene in real-time. For example, a mobile phone with a camera may capture a real-world scene (as an image or video) and display a composite of the captured scene with computer-generated virtual objects (e.g., two-dimensional and/or three-dimensional objects).

Computer-generated media, including augmented-reality effects, may be created in association with design tools or aides, configured to assist a user with design-related tasks. The design tools may be standalone tools to assist with a single task. Design tools may also take the form of a single package with a variety of aides built-in, each designed to assist with a particular task or problem-solving approach. These packages may be provided to users as an all-inclusive suite of tools, intended for use by power users and novices alike.

SUMMARY OF PARTICULAR EMBODIMENTS

In particular embodiments, one or more computing devices may provide a user interface allowing a user to design and implement augmented-reality effects. The user interface may be a user interface of an integrated design environment for creating augmented-reality effects. The computing devices may receive user input through interactions with the user interface and may translate that input into changes made to the design of the augmented-reality effect. In particular embodiments, the user interface may comprise a graph corresponding to elements of an augmented-reality effect. A portion of the user interface may enable a user to edit the augmented-reality effect by editing the graph. The graph may comprise one or more nodes and one or more edges. The nodes may correspond to actions associated with modules of an augmented-reality system. The edges may correspond to relationships or dependencies between the modules. In particular embodiments, one or more computing devices may perform actions in accordance with the nodes. The actions may involve specified steps resulting in the rendering of an augmented-reality effect based on the graph.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
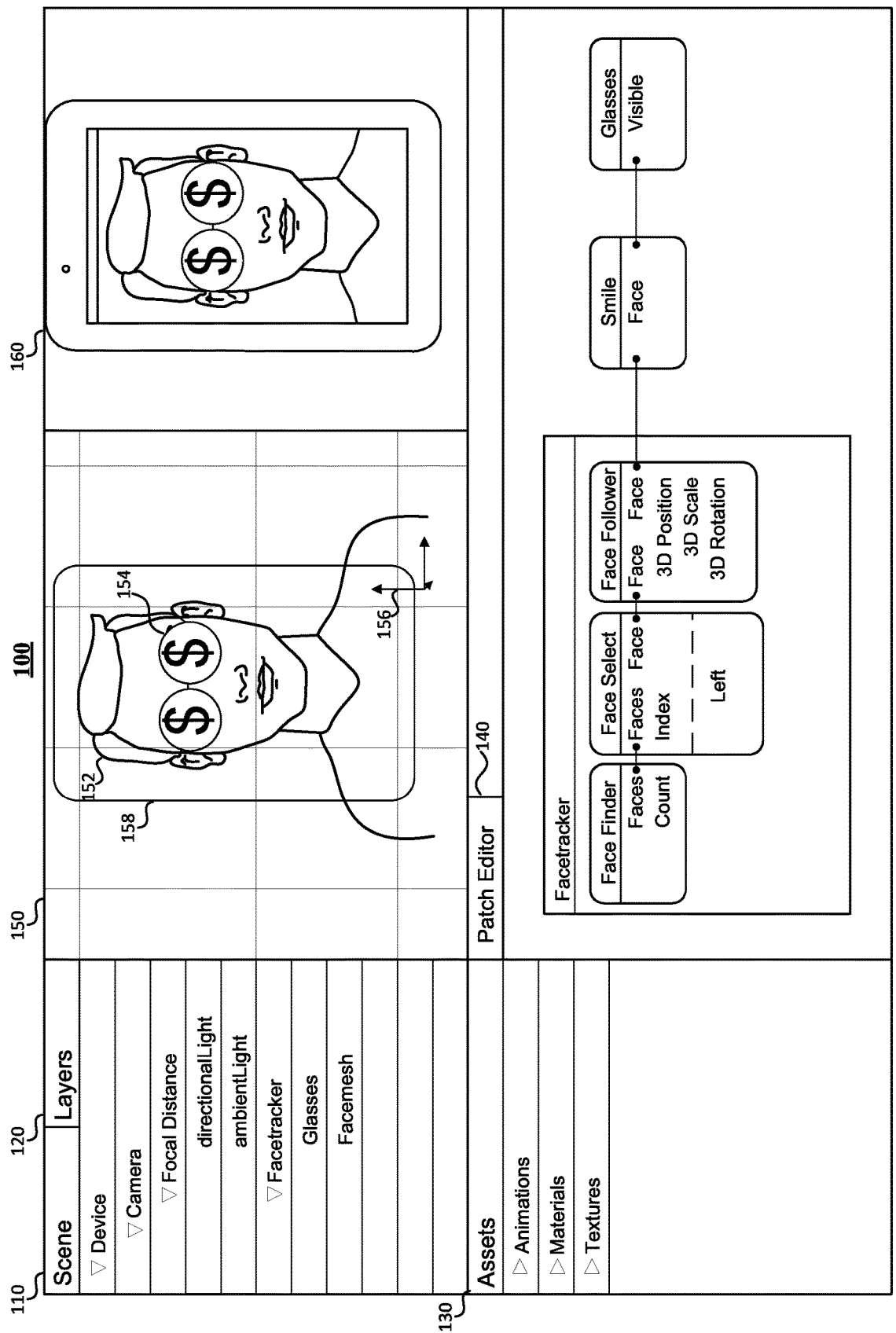
FIG. 1 illustrates an example user interface for designing augmented-reality effects.

In particular embodiments, one or more computing devices may provide a user interface enabling a user to design and implement augmented-reality effects. An augmented-reality effect may include a rendering of computer generated graphics superimposed on, or interacting with, images or video of the real world. In some cases, video footage of a real-world scene is captured and used as the setting of the augmented-reality effect.

Often, designing sophisticated augmented-reality effects can be challenging because it requires a combination of artistic and interface design with mastery of advanced programming techniques. Because many augmented-reality effects are based on recognizing the setting or elements in the scene, designing augmented-reality effect may require knowledge of computer vision, machine learning, artificial intelligence, and advanced graphics rendering. In addition, in order to specify the desired rules and logic for an augmented-reality effect, designers would need to learn the particular programming languages, libraries, and frameworks supported by the design platform, if any. Moreover, since text-based code writing is drastically different from graphics-based artistic design, the logic-design process is sharply decoupled from the artistic-design process, which negatively impacts the overall design experience. As such, designing engaging augmented-reality effects may require separate teams of artistic designers and technical experts to work closely with each other. Thus, the typical design process can be expensive, challenging, and out of reach for persons who lack the resources or know-how to operate the many interrelated disciplines.

Particular embodiments described herein provide a user interface that allows users to simply, quickly, and intuitively design both the artistic and logic aspects of augmented-reality effects. As an example, the user interface may be interactive and, similar to a "what you see is what you get" editor, provide for direct manipulation of the effect (both artistic and logic components). As another example, the interface may include graphical elements serving as abstractions of technical features of an augmented-reality system. The user may specify or configure those technical features by providing input through interactions with the graphical elements in the user interface.

In particular embodiments, the user interface may comprise a module for displaying or editing a graph corresponding to the rules and logic of the augmented-reality effect or components thereof. Because the graph relates to the creation or modification of an augmented-reality scene, the graph may be referred to as a scene graph. The graph may comprise elements representative of elements of the augmented-reality system or of the augmented-reality effect. In particular embodiments, a user may be able to specify the rules or logic governing certain aspects of the augmented-reality effect through editing the graph. The graph may comprise one or more nodes and one or more edges between nodes. The nodes may correspond to actions associated with processes of an augmented-reality system. As an example, one or more nodes of a scene graph may correspond to a module for detecting specific objects in the scene. As another example, one or more nodes of a graph may correspond to a module for following objects through a scene and acquiring data about those objects. The data may be used while generating the augmented-reality effects. The edges between nodes may correspond to relationships between the nodes. The relationships may implicitly or explicitly describe dependencies between the nodes. As an example, an edge may represent a data dependency between a first node and a second node, wherein the output of a process corresponding to the first node is used as the input for a process corresponding to the second node. As another example, an edge may represent a sequential dependency between a first node and a second node, wherein a process corresponding to a first node must be completed before a process associated with a second node can begin. In particular embodiments, one or more computing devices may give effect to the user's design as reflected in the scene-graph by performing actions associated with the nodes. The actions may involve steps that result in the rendering of an augmented-reality effect based on the graph. In particular embodiments, the computing device may generate instructions capable of being executed on other computing devices, or by the same computing device in a different use context, for performing actions in accordance with the graph.

FIG. 1 illustrates an example user interface 100 for designing augmented-reality effects. In particular embodiments, as shown in FIG. 1, the user interface 100 may be a user interface of an integrated design environment for creating augmented-reality effects. The integrated design environment may include components helpful to designers creating augmented-reality effects. In particular embodiments, the user interface 100 may include components such as a scene tree 110, a layer manager 120, an asset manager 130, a patch editor 140, and a viewport 150. The scene tree 110 may list all elements used in the scene. In the example of FIG. 1, the scene tree details elements of the camera assumed by the augmented-reality effect. The layer manager 120 may allow the user to add, edit, or delete layers of the augmented-reality effect. The layers may contain graphical elements of the designed effect. The asset manager 130 may allow the user to add, edit, or delete different graphical assets used in the augmented-reality effect. In the example of FIG. 1, the graphical assets include animations, materials, and textures used with the augmented-reality effect. The patch editor 140 may comprise an interactive scene graph that allows a user to design interactivity functions within the augmented-reality effect. As described in further detail below, the scene graph may simplify the programming tasks involved in creating the augmented-reality effect.

In particular embodiments, an augmented-reality scene may be generated by superimposing an augmented-reality effect on images or video captured by a media capture device associated with a computing device or previously-stored images or video of a real-world scene. The augmented-reality effect may comprise digital media, such as computer-generated images or video, or any other media suitable for use with an augmented-reality system. As an example only and not by way of limitation, a camera attached to a computing device may capture live footage to be used by an augmented-reality system. The augmented-reality effect may be superimposed on the captured footage to create the augmented-reality scene. In particular embodiments, the augmented-reality effect and augmented-reality scene may be displayed in a user interface of a computing device. As another example, the media used with the augmented-reality effect may be pre-rendered or computer generated. This may be useful to designers looking to have a consistent canvas on which to compare multiple designs. Although this disclosure describes generating augmented reality effects and scenes in a particular manner, this disclosure contemplates generating augmented reality effects and scenes in any suitable manner.

In particular embodiments, the viewport 150 may show a visual representation of the augmented-reality effect in an augmented-reality scene to the user. In particular embodiments, the viewport 150 may be split into multiple views. As an example, the viewport 150 in FIG. 1 includes a second viewport 160 showing a simulation of how the augmented-reality effect will appear to a user viewing the augmented-reality effect on a portable computing device. In the example of FIG. 1, the viewport shows several other elements that assist the user in designing the augmented-reality effect. The specific effect shown in the example of FIG. 1 includes superimposition of virtual glasses 154 onto the face of a person 152 in the scene. The viewport 150 shows a person 152 modeling the virtual-reality effect 154. Grid lines in the viewport may assist a designer with the placement of augmented-reality effects. A set of axes 156 is shown to assist a designer with determining the orientation of the augmented-reality effects. A window 158 also helps to orient the designer, so they are aware of the field of view of the camera. Although this disclosure describes a user interface and the components thereof in a particular manner, this disclosure contemplates a user interface presented in any suitable manner.

Figure 2:
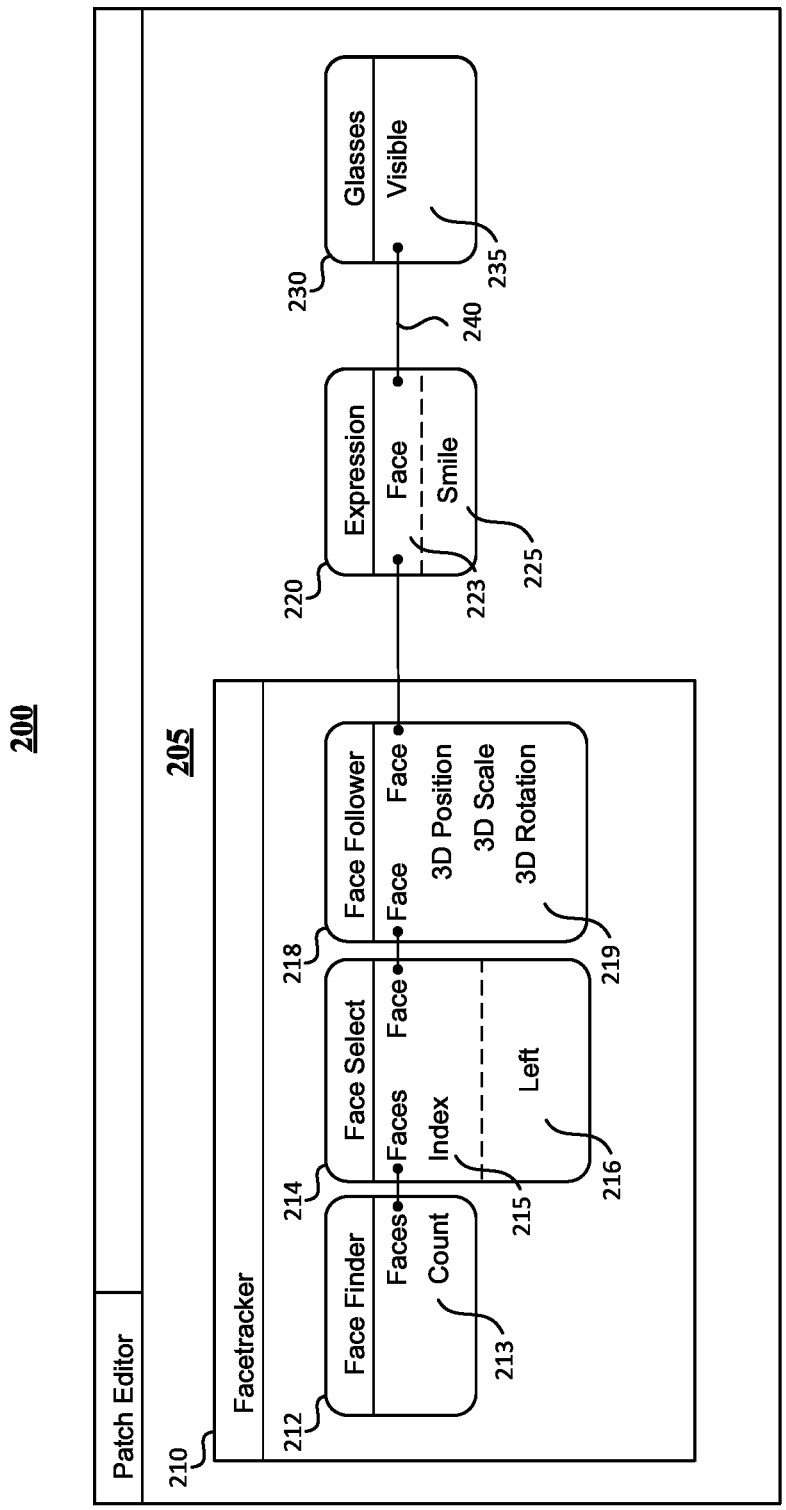
FIG. 2 illustrates an example graph for designing augmented-reality effects.

FIG. 2 illustrates an example graph for designing augmented-reality effects. Specifically, FIG. 2 illustrates an example patch editor 200. The patch editor 200 may allow a user to use an interactive graph 205 to design the rules and logic of an augmented-reality effect. Because the graph 205 may be used to design augmented-reality effects or augmented reality scenes, the graph may be referred to as a scene graph. The graph 205 comprises a plurality of nodes and plurality of edges 240 connecting the nodes. Each node in the graph 205 corresponds to a module of an augmented-reality effect or to an asset used by the effect. While or after placing a node or edge, a user many edit metadata associated with the node or edge. By manipulating the nodes and edges of the graph 205, a user may be able to design technical features of an augmented-reality effect without needing technical expertise. Abstracting the technical features away from the designing user may allow the developer of a design tool using a scene graph to continuously update the capabilities of the design tool without confusing the user or requiring lengthy documentation.

In particular embodiments, by editing the metadata associated with a node or edge, a user may specify or modify properties that affect the behavior of the module corresponding to the node. The metadata may also include purely cosmetic features, such as a display name or color used in the user interface 100. Example nodes include detector nodes, filter nodes, data-acquisition nodes, intermediary nodes, asset nodes, and any other suitable nodes. Although this disclose describes scene graphs in a particular manner, this disclosure contemplates scene graphs with many possible variations and combinations. Similarly, although this disclose describes specific nodes and edges of scene graphs, this disclosure contemplates nodes and edges suitable for a variety of purposes.

In the example graph 205 of FIG. 2, the user has placed a collective node 210 labeled "Facetracker." The collective node 210 allows a user to easily manipulate related nodes together as one. For example, a user may be able to place pre-designed modules as collective nodes that automate the function of commonly used modules. For the novice user, or a user with a straightforward goal, a pre-configured collective node may allow the user to focus on the design of the effect with less work required to determine the objects detected. In cases such as this, the collective node may be referred to as an object tracker node. As an example, the "Facetracker" collective node 210 includes three nodes 212, 214, and 218, connected by edges. Because of the specific component nodes, the collective node 210 shown in the graph 205 may be referred to as a "face tracker node" that provides a simplified interface to identify face object instances in an augmented-reality scene and design augmented-reality effects interacting with them. For users with more experience with augmented-reality effect design or a graph-based design tool, using only pre-configured collective nodes or object trackers may prove to be limiting. Because a pre-configured object tracker is intended for straightforward use, it may fail to harness the full range of capabilities of an augmented-reality system. To fully express their intentions, a user may need to introduce complexity into the graph by modifying a pre-configured tracker or starting from scratch. A user wishing to expand the complexity of the augmented-reality effect may wish to customize the nodes making up the collective node 210, as described below.

The first node 212 is a detector node labeled "Face Finder." As explained in further detail below, a detector node corresponds to a module for identifying instances of a type of object in a scene in accordance with the detector node. In the example of FIG. 2, the node 212 corresponds to a module for identifying human faces in the scene (e.g., using face-detection technology). The node 212 expresses this with the listing of relevant metadata 213. In node 212, the metadata 213 includes a list of elements related to a detector module of an augmented-reality system. By connecting the desired element(s) to a subsequent node using an edge, the user specifies that the corresponding data type is to be passed to the module corresponding to the subsequent node. For example, the metadata 213 of node 212 includes the object instances being detected (e.g., faces) and a count of the detected object instances. As indicated by the edge connecting the metadata elements to metadata elements of the neighboring node 214, these metadata elements are output by the detector module corresponding to the detector node 212.

The second node 214 is a filter node labeled "Face Select." As explained in further detail below, a filter node may correspond to a module for selecting instances of a detected object of a specific object type in accordance with selection criteria specified by the filter node. The module corresponding to a filter node may receive as input a collection of detected object instances and related metadata, and output a collection of instances of interest of the object that satisfy the specified criteria. In the example graph 205 of FIG. 2, the filter node 214 indicates its input data types and output data types in the listing of metadata 215. The listing appearing on the left side of the filter node 214 corresponds to input data received by the module corresponding to the filter node 214. These data include the collection of objects (or references thereto) detected by the process corresponding to detector node 212, and/or an index of those objects that allows for simplified reference to those objects. The listing appearing on the right side of the filter node 214 correspond to data output by the module corresponding to the filter node 214. In the example graph 205 of FIG. 2, the filter node 214 indicates that a single selected object instance is output by the corresponding filter module. The filter node 214 may also indicate the criteria used by the corresponding filter module. In the example graph 205 of FIG. 2, the filter node 214 indicates that the criteria 216 is to select the most prominent face on the left side of the augmented-reality scene.

The third node 218 is a data-acquisition node labeled "Face Follower." As explained in further detail below, a data-acquisition node (also referred to as a "follower node") may correspond to a module for collecting information about one or more selected object instances of an object type in accordance with the data-acquisition node. The module corresponding to a data-acquisition node may receive as input a collection of the selected object instances and may output a collection of information about those instances of interest. In the example graph 205 of FIG. 2, the data-acquisition node 218 indicates the object type of the relevant selected object instances and the collected information in the listing of metadata 219. The listing appearing on the left side of the data-acquisition node 218 correspond to input data received by the module corresponding to the data-acquisition node 214. These data include the detected object instances selected by filter node 214. The metadata appearing on the right side of the data-acquisition node 218 correspond to data output by or available from the module corresponding to the data-acquisition node 218. In the example graph 205 of FIG. 2, this includes the three-dimensional position of the instance, the three-dimensional scale of the instance, and the three-dimensional rotation of the instance. The data-acquisition node 218 also includes a shorthand reference to all of the metadata, indicated by the output labeled "Face." This shorthand reference may be used to easily reference the metadata to be used by other nodes.

In the example graph 205 of FIG. 2, the user has placed an intermediary node 220 labeled "Expression." The intermediary node 220 may correspond to a module for detecting particular events or characteristics of interest with respect to the input data (e.g., detecting whether the detected face is smiling, blinking, frowning, etc.), thereby allowing a user, another component of an augmented-reality system, another component of a computing device, or another computing device to interact with the augmented-reality effect in accordance with the intermediary node. In the example graph 205 of FIG. 2, the intermediary node 220 indicates data related to the interaction in the listing of metadata 223. The listing of metadata 223 comprises the object that makes up the focal point of the interaction. The metadata 223 listed for intermediary node 220 indicates that the focal point is the selected face object instance about which data is collected by the data-acquisition node 218. The listing 225 indicates the type of interaction, which in this case is a smile detected by the module corresponding to the intermediary node 220 on the tracked face.

In the example graph 205 of FIG. 2, the user has placed an asset node 230 labeled "Glasses." The asset node 230 may correspond to an asset or collection of assets used in the augmented-reality effect. The asset node 230 may indicate other properties of the assets, or how they are to be handled in the augmented-reality effect. In the example graph 205 of FIG. 2, the asset is a virtual pair of glasses that may be drawn in some relation to an object in the scene. In particular, the glasses are drawn based on the output of the module corresponding to the intermediary node 230. This is indicated by the edge 240 between the intermediary node 220 and the asset node 230. As indicated in the listing of metadata 235 associated with the asset node 230, the glasses asset will be made visible (e.g. superimposed on the scene) based on the output. Although this disclosure describes a graph for designing augmented-reality effects in a particular manner, this disclosure contemplates a graph for designing augmented-reality effects presented in any suitable manner.

Figure 3:
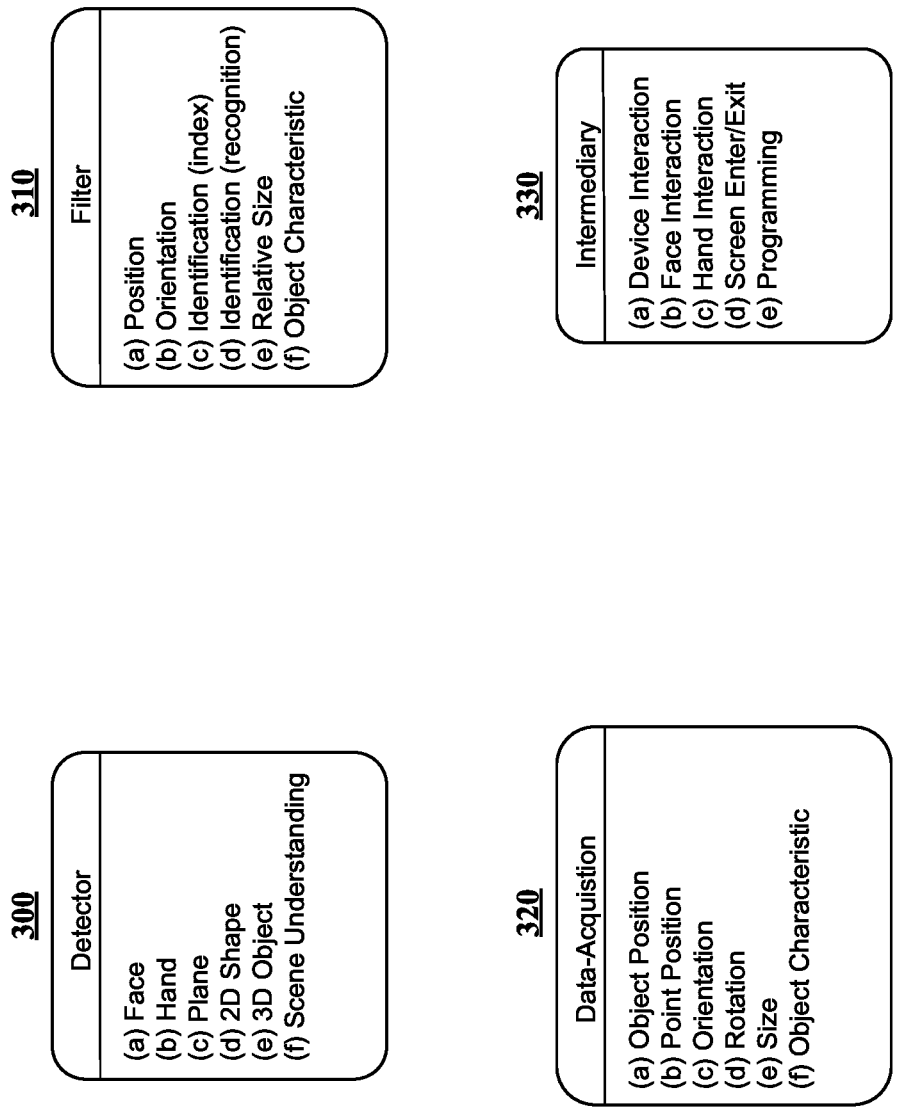
FIG. 3 illustrates examples of nodes and example properties of nodes that may be used in a graph for designing augmented-reality effects.

FIG. 3 illustrates examples of nodes and example properties of nodes that may be used in a scene graph, such as the graph 205. Through interactions with a user interface, a user may be able to add, delete, or reposition the nodes of a scene graph. A user may be able to modify the properties of a node of a scene. A user may be able to specify the properties of a node of a scene graph when the user adds the node to the graph. In particular embodiments, the behavior of a module of an augmented-reality system corresponding to a node are based on the properties specified for the node. The examples in FIG. 3 are intended to provide descriptive examples only and are not intended to limit the invention described herein.

FIG. 3 further illustrates an example set of detector node types 300. A detector node of a scene graph may correspond to a module configured to identify instances of one or more object types in a scene. The module may be configured to detect all instances of the object type in the scene. In particular embodiments, the module corresponding to a detector node may use computer vision and machine learning techniques to identify the specified types of objects. Because object recognition techniques are rapidly improving, the provider of an augmented-reality system may wish to update the object recognition capabilities of a system regularly. Abstracting the implementation of object identification behind a graph-based design tool allows the provider to continuously improve the system while minimizing a user's downtime or confusion. In particular embodiments, the module may be configured to identify up to a threshold number of objects in the scene. The threshold number may be specified by a user or may be automatically determined by an augmented-reality system. A detector node may be configured to correspond to a detector of a single object type. In particular embodiments, the particular object type may be a human feature. For example, as the set 300 shows, a detector node may be a face-type detector node or a hand-type detector node. A face-type detector node may be configured to identify all instances of a human face in a scene. A hand-type detector node may be configured to detect all instances of a human hand in a variety of positions.

In particular embodiments, a detector node may be configured to correspond to a detector of shapes or volumes. For example, as set 300 shows, a detector node may be a plane-type detector node or two-dimensional shape-type detector node. In particular embodiments, a plane-type detector node may correspond to a module for detecting planes in the scene. A plane may correspond to a horizonal surface in the scene such as a floor, table, or other platform onto which an augmented-reality effect can be drawn as though placed on top of, or underneath a plane. A plane may correspond to a vertical surface in the scene such as a wall, window, or other canvas onto which an augmented-reality effect can be drawn. In particular embodiments, a two-dimensional shape-type detector node may correspond to a module for detecting discrete two-dimensional shapes in a scene. For example, a two-dimensional shape-type node may be configured to identify basic shapes, such as circles, squares, or triangles, more complex shapes, arbitrary or user-specified shapes, or any other suitable two-dimensional shape.

In particular embodiments, a detector node may be configured to correspond to a module for detecting three-dimensional volumes or objects. In particular embodiments, a three-dimensional volume-type detector node may correspond to a module for detecting volumes in a scene. For example, a volume-type detector node may correspond to a module configured to detect cube, spheres, prisms, user-specified or arbitrary volumes, or other suitable three-dimensional volumes. A three-dimensional object-type detector node may correspond to a module for detecting a specified three-dimensional object. The specified three-dimensional object may be a class of objects, such as food, books, or cars. The specified three-dimensional object may be a specific type of a class of objects, such as apples, bananas, or hamburgers. The specified three-dimensional object may be a specific instance of a type of object. For example, the module may be configured to detect instances of Golden Delicious apples or over-ripened bananas.

In particular embodiments, the detector node may be a scene understanding-type detector node. A scene understanding-type detector node corresponds to a module for evaluating a scene and making a specific determination about the scene which may be used by other modules. As an example only and not by way of limitation, a scene understanding-type detector node may correspond to a module for determining whether a sunrise or sunset is in the scene. The module may analyze the scene determine additional information about the scene, such as whether there are persons in the scene with a sunset. This information may be used by other modules as described further herein. Although this disclosure describes detector nodes in a particular manner, this disclosure contemplates any suitable detector nodes.

FIG. 3 further illustrates an example set of filter node selection criteria 310. A filter node may correspond to a module for selecting detected object instances from a collection of object instances in accordance with selection criteria specified by the filter node. The module corresponding to a filter node receives as input a collection of objects and related data, and outputs a collection of selected object instances. Thus, a filter node may correspond to a module for selecting from any of the object types that a module corresponding to a detector node is configured to identify. A selected object instance that satisfies at least one selection criterion may be referred to as an instance of interest. Selection criteria may be selected by the user, may be pre-selected or automatically generated, or may be selected through any other suitable manner. In particular embodiments, the module corresponding to the filter node may be configured to select all detected object instances that satisfy the criteria. In particular embodiments, the module corresponding to the filter node may be configured to select a number of detected object instances up to a threshold number of instances. The threshold may be specified by a user, may be pre-set for the type of object, or may be automatically configured. A filter node generally enables a user to customize the augmented-reality effect by specifying which detected object instances an augmented-reality effect should be based on or interact with. Customization may greatly increase the expressivity of an augmented-reality in giving more control to a designer without dramatically increasing the complexity of the design tool itself. Thus, a filter node with an ostensibly simple outward design provides powerful resources to even novice designers of augmented-reality effects.

As the set of filter node selection criteria 310 indicates, the module corresponding to a filter node may be configured to select from a collection of detected object instances using a wide array of criteria. In particular embodiments, selection criteria may be applied to a plurality of different object types. In particular embodiments, selection criteria may be specific to the object type. In particular embodiments, the selection criteria of a filter node may be based on the position of the objects. For example, the selection criteria may comprise objects on the left side of the scene. As another example, the selection criteria may comprise objects in the background, where the module is capable of determining at least a foreground and background of a scene. Other position-related criteria may comprise other cardinal directions (right, bottom, top), depths (foreground, middle), position relative to an edge of a window into the scene, position relative to other objects (partially obscured, obscuring), or any other suitable criteria. In particular embodiments, the selection criteria of a filter node may be based on the orientation of the objects. For example, the selection criteria may specify inverted instances of an objects, or instances oriented parallel to the horizon. In particular embodiments, the selection criteria of a filter node may be based on the absolute or relative size of the objects. For example, the selection criteria may specify a threshold number of the largest or smallest instances of the type of object in the scene. In particular embodiments the module corresponding to the filter node may be configured to determine the size of an instance relative to a known reference point, and select instances based on that size.

In particular embodiments, the selection criteria of a filter node may be based on a persistent or semi-persistent index of objects in the scene. The module corresponding to the filter node may be configured to assign an index to object instances in the collection of detected object instances. The module may be configured to store the index for a specified amount of time and to repeatedly select the same instance or instances of the object. Thus, to the end user, i.e., the user viewing the augmented-reality effect, the module corresponding to the filter node appears to remember which object instances were selected during the same session. In particular embodiments, the selection criteria of a filter node may be based on recognition-type criteria for a specified object type. As an example only and not by way of limitation, a user may have trained a face-learning model to recognize her face. With this recognition model, the module corresponding to a filter node may be able to select only the user's face, even if multiple faces are present in the scene. The augmented-reality effect may be selectively applied relative to only the user's face, or a specific augmented-reality effect may be applied relative to the user's face while applying other augmented-reality effects relative to other faces detected in the scene.

In particular embodiments, the selection criteria of a filter node may be based on a characteristic specific to the type of object being selected. Each object type may have designated characteristics unique to that object type. As an example only and not by way of limitation, a filter node for face object instances may be configured with selection criteria such as physical characteristics of the face including the age or gender of the face or whether the face has glasses or facial hair. As another example, a filter node for hand object instances may be configured with selection criteria such as a gesture being made by the hand, i.e., thumbs-up, high-five, or palm up or down. As another example, a filter node for two-dimensional shapes or three-dimensional objects may be configured with selection criteria such as color. In particular embodiments, a user may be able to create custom object-type specific selection criterion through a traditional programming interface. Although this disclosure describes filter nodes in a particular manner, this disclosure contemplates any suitable filter nodes.

FIG. 3 further illustrates an example set 320 of data-types that a data-acquisition node may obtain. A data-acquisition node (also referred to as a "follower node") may correspond to a module for collecting information about one or more selected object instances of an object type. The module corresponding to a data-acquisition node receives as input a collection of selected instances and outputs a collection of information about those selected instances. In particular embodiments, the data-acquisition node my continuously update the collected information as it changes over time. As an example, the information may change because the position of the selected object instances has changed in the augmented-reality scene. This may be caused by the instances of interest moving in the scene, the camera moving, or a combination of both. Other properties of the selected object instances may also change over time, and the module corresponding to the data-acquisition node may update collected information relating to those properties continuously or at specified intervals.

In particular embodiments, the collected information may include the position of the object instance. As an object instance moves throughout the scene, the position of the object instance may be continuously updated in the module corresponding to the data-acquisition node. For example, a data-acquisition module may be configured to receive as input a face object instance. The user may cause the camera to the scene to move, which has the effect of moving the face object instance about the scene. The position of the face object instance may be updated so that any augmented-reality effects rendered relative to the position of the face object instance may be rendered correctly. In particular embodiments, the collected information may include the position of a point on an object instance in the scene. For example, a module corresponding to a data-acquisition node may be configured to receive as input a hand object instance. The module may continuously update the location of the tip of the thumb of the hand object instance.

In particular embodiments, the collected information may include the orientation or rotation of the instance of an object instance. Both orientation and rotation may be specified relative to a global axis or an object specific axis. In particular embodiments, the rotation of an object instance may be a continuous variable relative to a given axis. In particular embodiments, the orientation of an object instance may refer to the discrete characterization of the rotation of an object (e.g., horizontal or vertical). For example, a module corresponding to a data-acquisition node of an object may be configured to receive as input an instance of pyramid object. The module may have been configured that the state of the instance of the pyramid object as first detected is its default orientation. As an example only and not by way of limitation, the pyramid object may be rotated in the scene about its own vertical axis (i.e., by rotating the camera or the instance of the pyramid object itself). As the pyramid rotates, the module corresponding to the data-acquisition node may continuously update the rotation of the pyramid relative to its default state. When the rotation of the pyramid exceeds some threshold value, e.g., 150 degrees, the module may update the orientation of the instance of the pyramid object to be reversed.

In particular embodiments, the collected information may include the size or scale of the object instance. The size of the object may be specified according to one or more reference points. As an example, the reference point may be the original size of the object instance when first detected by the augmented-reality system. As an example, the reference point may be the size of some fixed or object of known size in the scene. As the size of the object instance changes relative to one or more of the reference points, the module corresponding to the data-acquisition node may be update the size of the instance. Size may be specified in a variety of units, including absolute units if known, or percentages relative to the reference point.

In particular embodiments, the collected information may include one or more characteristics specific to the type of the object instance about which information is collected. For example, for a face object, the module corresponding to the data-acquisition node may be configured to detect whether the face is smiling, the eyes of the face are open, or an emotion of the face. The module may update values corresponding to the status of the characteristic as it changes. As another example, for a hand object instance, the module corresponding to the data-acquisition node may be configured to detect the gesture may by the hand and update store values accordingly. Although this disclosure describes data-acquisition nodes in a particular manner, this disclosure contemplates any suitable data-acquisition nodes.

FIG. 3 further illustrates an example set of intermediary node types 330. In particular embodiments, an intermediary node may correspond to a module related to the presentation of an augmented-reality effect. In particular embodiments, an intermediary node may correspond to a module allowing a user, another component of an augmented-reality system, another component of a computing device, or another computing device to interact with the augmented-reality effect. For example, the interaction may include a user interacting with an augmented-reality system to cause an effect in the scene.

In particular embodiments, an intermediary node may correspond to a module configured to detect an interaction with a computing device on which an augmented-reality effect is presented. The interaction may comprise a device tap or click, a device shake or squeeze, pressing a physical or virtual key of the device, interaction with a peripheral device associated with the computing device, or any other interaction with a computing device. In particular embodiments, the interaction may comprise an interaction specifically associated with an element in the augmented-reality scene, real or virtual. As an example only and not by way of limitation, the intermediary node may correspond to a screen tap associated with a face object instance in the augmented-reality scene. The augmented-reality effect may perform an action related to the face object instance based on the screen tap. In particular embodiments, an intermediary node may correspond to a module configured to detect an action associated with the augmented-reality scene. The action may comprise the presence of a particular object in the scene, a particular object entering or exiting the scene, modifying an object or the position of an object in the scene, any other suitable action or any combination thereof.

In particular embodiments, an intermediary node may correspond to a module configured to detect actions performed by a face object instance in the augmented-reality scene. The action may comprise a head rotation, a head nod or shake, opening or closing of the mouth, opening or closing the one or more eyes, raising or lowering one or more eyebrows, a smile, any other suitable action that may be performed by a face object instance, or any combination thereof. In particular embodiments an intermediary node may correspond to a module configured to detect actions performed by a hand object instance in an augmented-reality scene. The action may comprise presenting one or more hand gestures in the scene, including, for example, a "thumbs up" gesture, an "OK" gesture, a "peace" gesture, showing a palm up or down, setting out a specific number of fingers, tapping a finger to the thumb, any other suitable gesture, or any combination thereof.

In particular embodiments, an intermediary node may correspond to a module configured to handle one or more actions performed by an augmented-reality system providing an augmented-reality effect. These actions may comprise actions related to animating an augmented-reality effect, for example beginning or ending an animation, looping an animation, providing keyframe transitions, or any other suitable animation action. The actions may be value counter or switch actions wherein some other actions causes a state-based variable to change state or a counter-based variable to increment or decrement. The actions may be operations allowing compound interactions to be programmed through the graph, for example through mathematical or logical operations. The action may comprise any other suitable action performed by an augmented-reality system providing an augmented-reality effect. Although this disclosure describes intermediary nodes in a particular manner, this disclosure contemplates any suitable intermediary nodes.

Figure 4A:
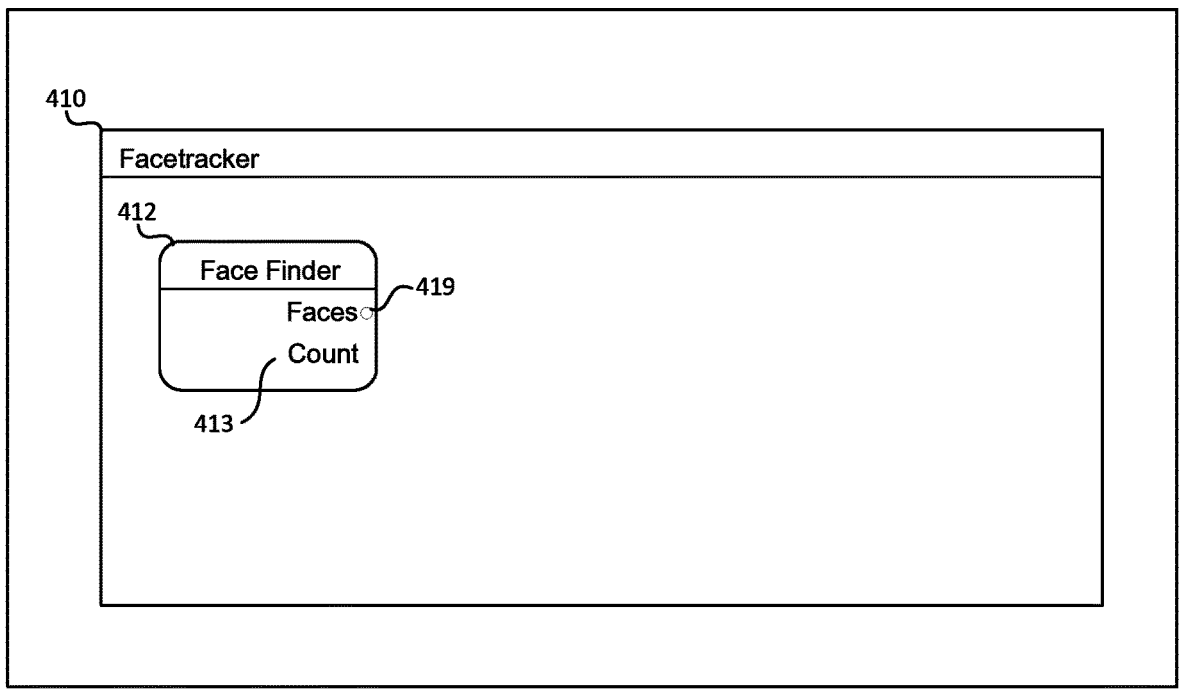
FIGS. 4A-4D illustrate the creation of an example graph.
Figure 4B:
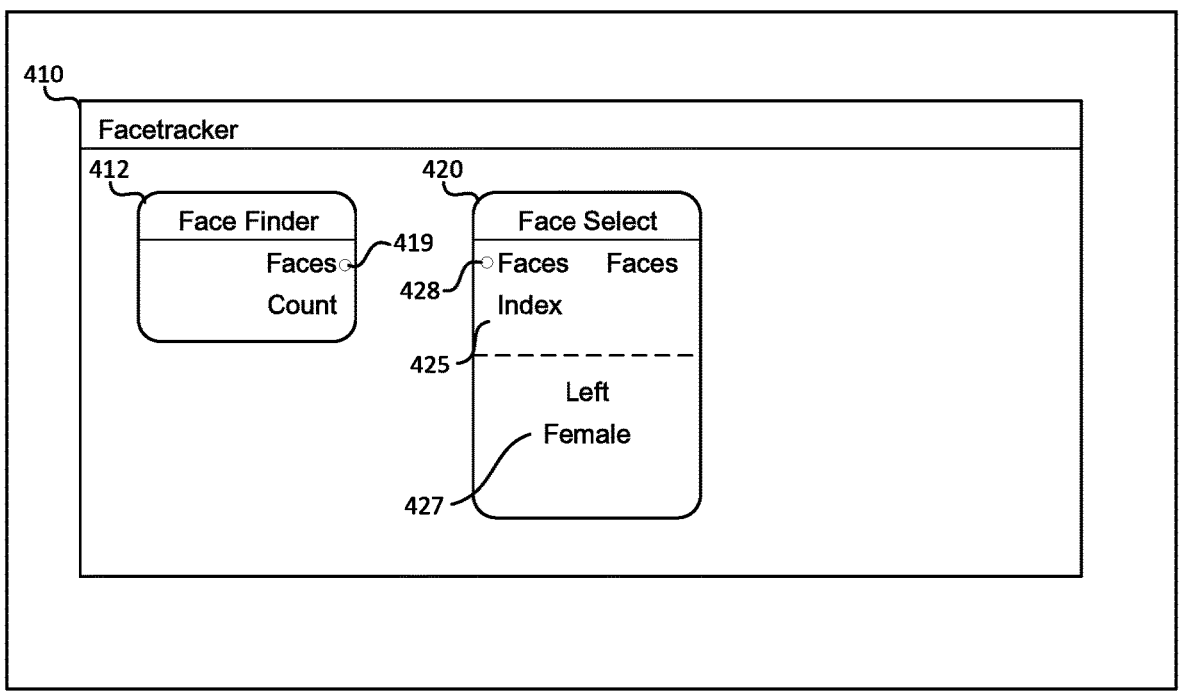

FIGS. 4A-4D illustrate the creation of an example scene graph. FIG. 4A illustrates a scene graph 405a in which a user has inserted a collective node 410 labeled "Facetracker." The user has added a detector node 412 to the collective node 410 for detecting face object instances. The metadata 413 associated with the detector node 412 indicates that a module configured according to the detector node 412 may output data comprising a collection of face object instances detected in an augmented-reality scene and a count (i.e., the number of face object instances in the collection). In a user interface comprising the scene graph 405a, the detector node 412 further comprises a port 419. The port 419 indicates that the data elements associated with the detector node 412 can be connected to another node in the scene graph. In the example of FIG. 4A, the port 419 is next to the Faces elements in the listing of metadata 413. This indicates that the collection of faces can be passed to another node. To expand the scene graph, the user adds another node as shown in FIG. 4B.

FIG. 4B illustrates the scene graph 405b in which the user has added a filter node 420 to the scene graph 405a shown in FIG. 4A. The filter node 420 corresponds to a filter module of an augmented-reality system configured to select among face object instances. The metadata 425 associated with the filter node 420 indicates that a module configured according to the filter node 420 expects as input a collection of faces and an index of the faces. The metadata 425 also indicates that the output of a module configured according to the filter node 420 comprises a collection of faces matching one or more criteria. The filter node 420 lists the criteria 427 used to select face object instances of interest. According to that criteria the module corresponding to the filter node 420 has been configured correspond to a module to select female face object instances on the left side of the window to the scene. Face object instances of interest detected by the module configured according to the detector node 420 that satisfy these criteria are output by the corresponding module. The filter node 420 comprises a port 428 associated with the expected input data. This indicates that the expected input data associated with the port 428 can be received by connection to another node.

Figure 4C:
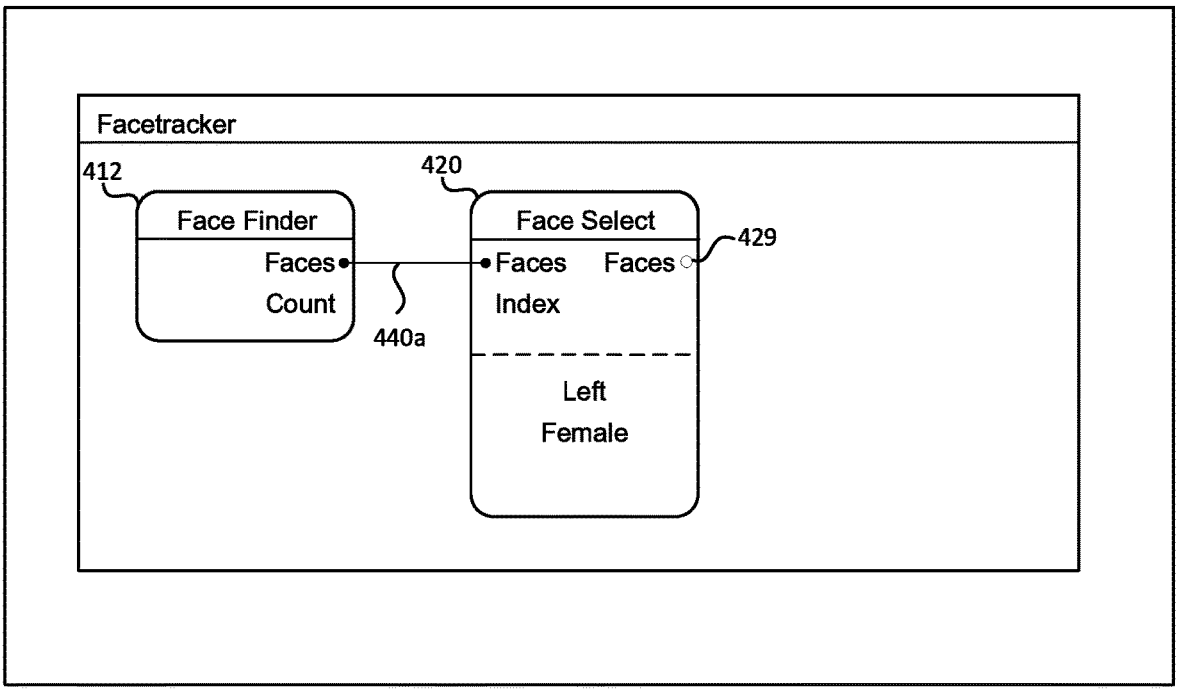

FIG. 4C illustrates the scene graph 405c in which the user has drawn an edge 440a between the detector node 412 and filter node 420. As indicated by the edge 440a, data output by a module configured according to the detector node 412, namely a collection of face object instances, are configured to be sent to a module configured according to with the filter node 420. A module configured according to the filter node 420 will receive the data as a collection of faces and an index to the faces in the collection. After the user has connected the detector node 412 to the filter node 420, the filter node 420 indicates that the user can further expand the scene graph 405c. The filter node 420 comprises the port 429, which indicates that the output of a module configured according to the filter node 420 can be used with another component of an augmented-reality system corresponding to a node in the scene graph 405c.

Figure 4D:
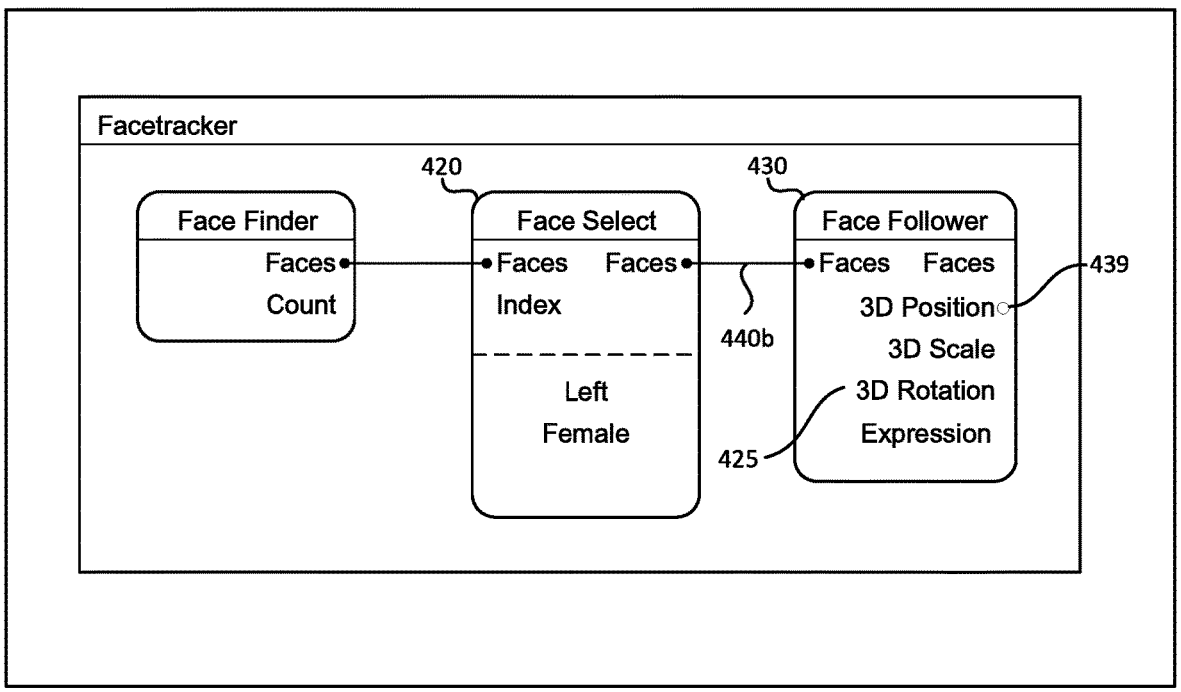

FIG. 4D illustrates the scene graph 405d in which the user has further expanded scene graph 405c by adding the data-acquisition node 430. The data-acquisition node 430 corresponds to a module for collecting information about selected face object instances. As the metadata 425 associated with the data-acquisition node 430 indicates, a module configured according to the data-acquisition node 430 will expect to receive as input a collection of selected face object instances. The module will output the collected information. In particular, the module configured according to the data-acquisition node 430 will collect and output information about the three-dimensional Position, three-dimensional scale, three-dimensional rotation, and expression of the selected face object instances. The filter node 420 and data-acquisition node 430 have been connected via an edge 440b. The edge 440b indicates that the output of a module configured according to the filter node 420 will be passed to a module configured according to the data acquisition node 430 as input. The data-acquisition node 430 further comprises the port 439, which indicates that the output of a module configured according to the data-acquisition node 430 can be used with another node in the scene graph 405d. The scene graph 405d can thus be expanded by the user as desired to continue designing an augmented-reality effect using the scene graph 405d. Although this disclosure describes creating a scene graph in a particular manner, this disclosure contemplates creating a scene graph in any suitable manner.

Figure 5A:
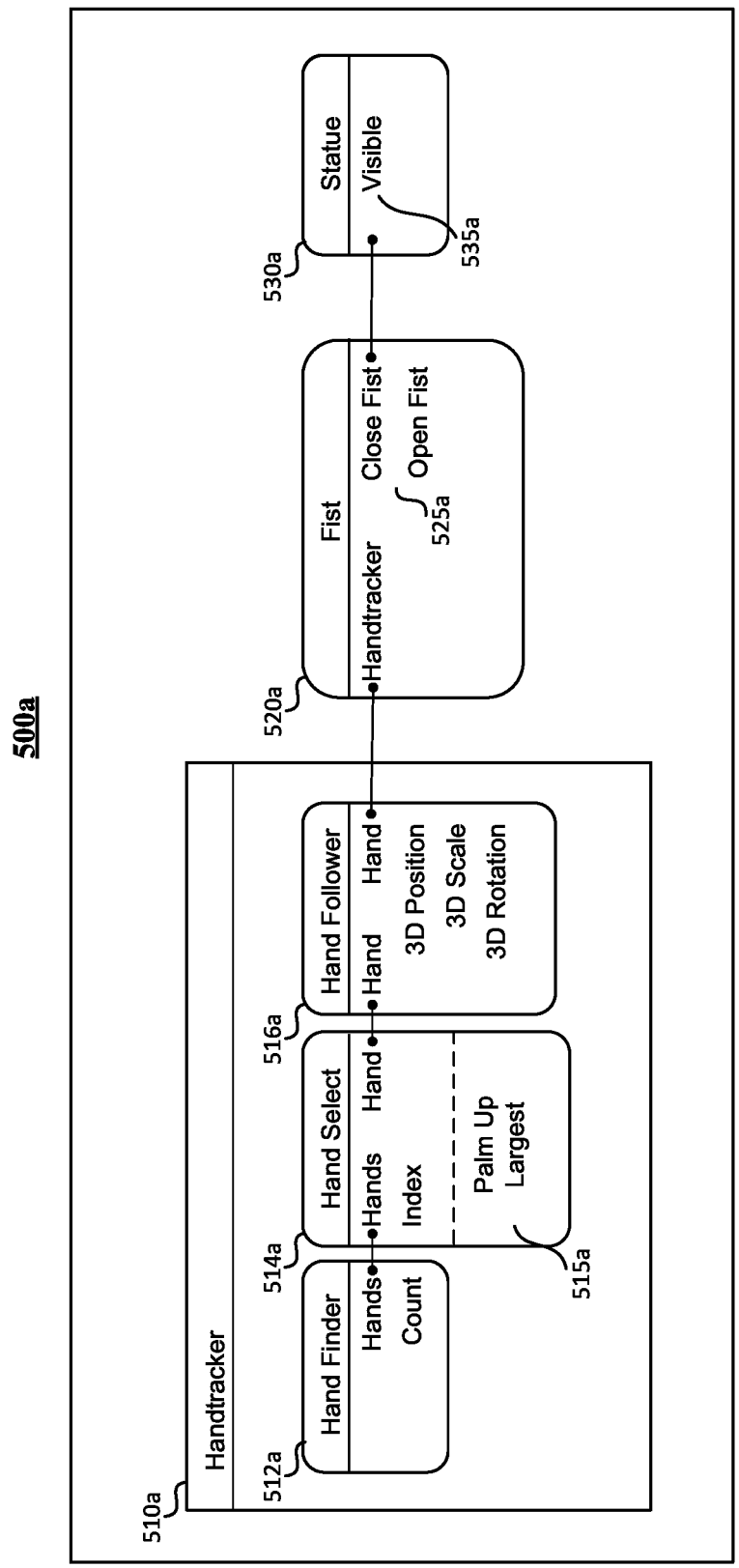
FIGS. 5A-5D illustrate example graphs associated with a variety of augmented-reality effects.

FIGS. 5A-5D illustrate example scene graphs associated with a variety of augmented-reality effects. FIG. 5A illustrates a scene graph 500a corresponding to an augmented-reality effect wherein a virtual statue object is render in an open, palm-up hand in the scene. The scene graph comprises a collective node 510a labeled "Handtracker" that corresponds to a module for identifying and tracking the largest hand in the scene. The collective node 510a further comprises a detector node 512a, a filter node 514a, and a data-acquisition node 516a. A module configured according to the detector node 512a labeled "Hand Finder" will identify all hand object instances in the scene. The module will send the collection of hand object instances to a module configured according to the filter node 514a labeled "Hand Select." As the selection criteria 515a of the filter node 514a indicates, a module configured according to the filter node 514a will select the single largest hand object instance making a "Palm Up" gesture. This instance of interest will then be sent to the module configured according to the data-acquisition node 516a. The module configured according to the data-acquisition node 516a will be configured to collect information including the three-dimensional position, three-dimensional scale, and three-dimensional rotation and send the collected information to other modules involved in the creation of the augmented-reality effect.

In particular, the module configured according to the data-acquisition node 516a will send the collected information to a module configured according to the intermediary node 520a labeled "Fist." The intermediary node 520a corresponds to a module for detecting particular hand gestures. As the metadata 525a of the intermediary node 520a indicates, a module configured according to the intermediary node 520a receives the collected information from a hand tracking module or collection of modules and detects whether the hand object instance has made a close first gesture. If the close first gesture is detected, one or more properties of the asset node 530a are modified. The asset node 530a labeled "Statue" corresponds to a statue object rendered by a rendering engine as a component of a virtual-reality effect. One or more modules of the augmented-reality system can modify the properties of the asset as needed to affect the design of the augmented-reality effect. In this example, the "Visible" property shown with the metadata 535a of the asset node 530a is switched on or off each time a module configured according to the intermediary node 520*a* detects the close first gesture.

Figure 5B:
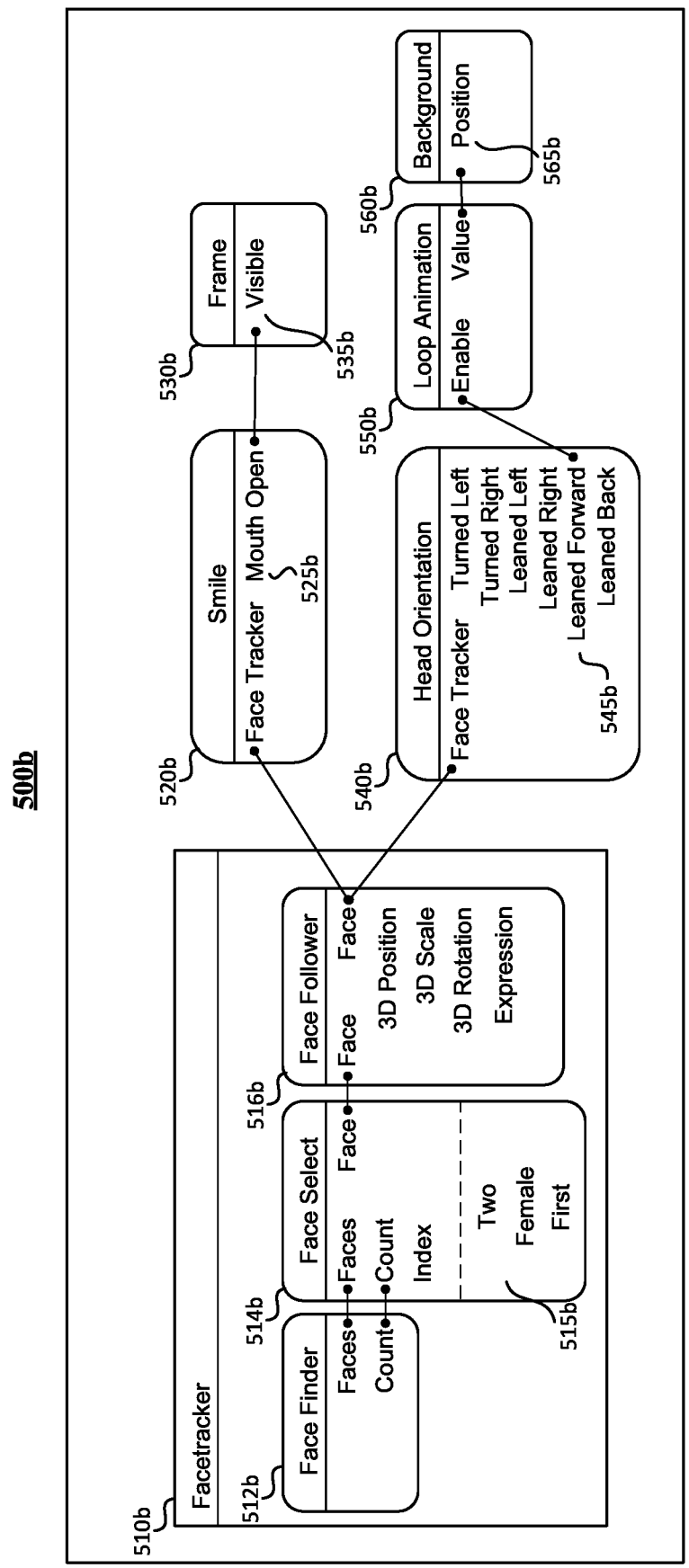

FIG. 5B illustrates a scene graph 500*b* corresponding to an augmented-reality effect wherein gestures detected in association with face object instances affect the visibility and animation of assets in the effect. The scene graph 500*b* comprises a collective node 510*b* labeled "Facetracker" that corresponds to a module for identifying and tracking the first two recognized female faces in the scene. The collective node 510*b* further comprises a detector node 512*b*, a filter node 514*b*, and a data-acquisition node 516*b*. A module configured according to the detector node 512*b* labeled "Face Finder" will identify all face objects in the scene. The module will send a collection of detected face object instances and the count of the face objects to a module configured according to the filter node 514*b* labeled "Face Select." As the selection criteria 515*b* of the filter node 514*b* indicates, a module configured according to the filter node 514*b* will select female face object instances in the scene. The module will then register indices for the face object instances. In the example augmented-reality effect shown by scene graph 500*b*, the module will be configured to select no more than two instances. If more than two female face objects are received, the module will be configured to select the first two female face object instances. The selected instances will then be sent to the module configured according to the data-acquisition node 516*b*. The module configured according to the data-acquisition node 516*b* will be configured to collect information including the three-dimensional position, three-dimensional scale, three-dimensional rotation, and expression and send the collected information to other modules involved in the creation of the augmented-reality effect.

In particular, the module configured according to the data-acquisition node 516*b* will send the collected information to a module configured according to the intermediary node 520*b* labeled "Smile." The intermediary node 520*b* corresponds to a module for detecting a particular facial expression. As the metadata 525*b* of the intermediary node 520*b* indicates, a module configured according to the intermediary node 520*b* will receive the collected information from a face tracking module or collection of modules and detect whether the either of the face object instances has made an open smile. If a smile expression is detected, one or more properties of the asset node 530*b* are modified. The asset node 530*b* labeled "Frame" may correspond to a virtual frame object rendered and superimposed on the scene around the face object instances by a rendering engine as a component of a virtual-reality effect. In this example, the "Visible" property shown within the metadata 535*b* of the asset node 530*b* is modified to be "on" or "off" each time a module configured according to the intermediary node 520*b* detects the smile expression. Additionally, the scene graph 500*b* indicates that the module configured according to the data-acquisition node 516*b* will send the collected information to a module configured according to the intermediary node 540*b* labeled "Head Orientation." The intermediary node 540*b* corresponds to a module for detecting particular head orientations. As the metadata 545*b* of the intermediary node 540*b* indicates, a module configured according to the intermediary node 540*b* will receive the collected information from a face tracking module or collection of modules and detect whether the face object instances have rotated to specific orientations. These orientations include turning left and right as well as leaning to a threshold degree forward, backward, to the left, or to the right. In this example, if face object instance has "leaned forward," a trigger is sent to the intermediary node 550*b* labeled "Loop Animation." The intermediary node 550*b* corresponds to a command controlling whether an animation asset is plays or pauses. In this example, the trigger sent by a module corresponding to the intermediary node 540*b* will cause a module corresponding to intermediary node 550*b* to enable the animation. In turn, enabling the animation causes a module of the augmented-reality system to modify the position value associated with the "Background" asset, as indicated by the metadata 565*b* of asset node 560*b*. The asset is then rendered by a rendering component of the augmented-reality system.

Figure 5C:
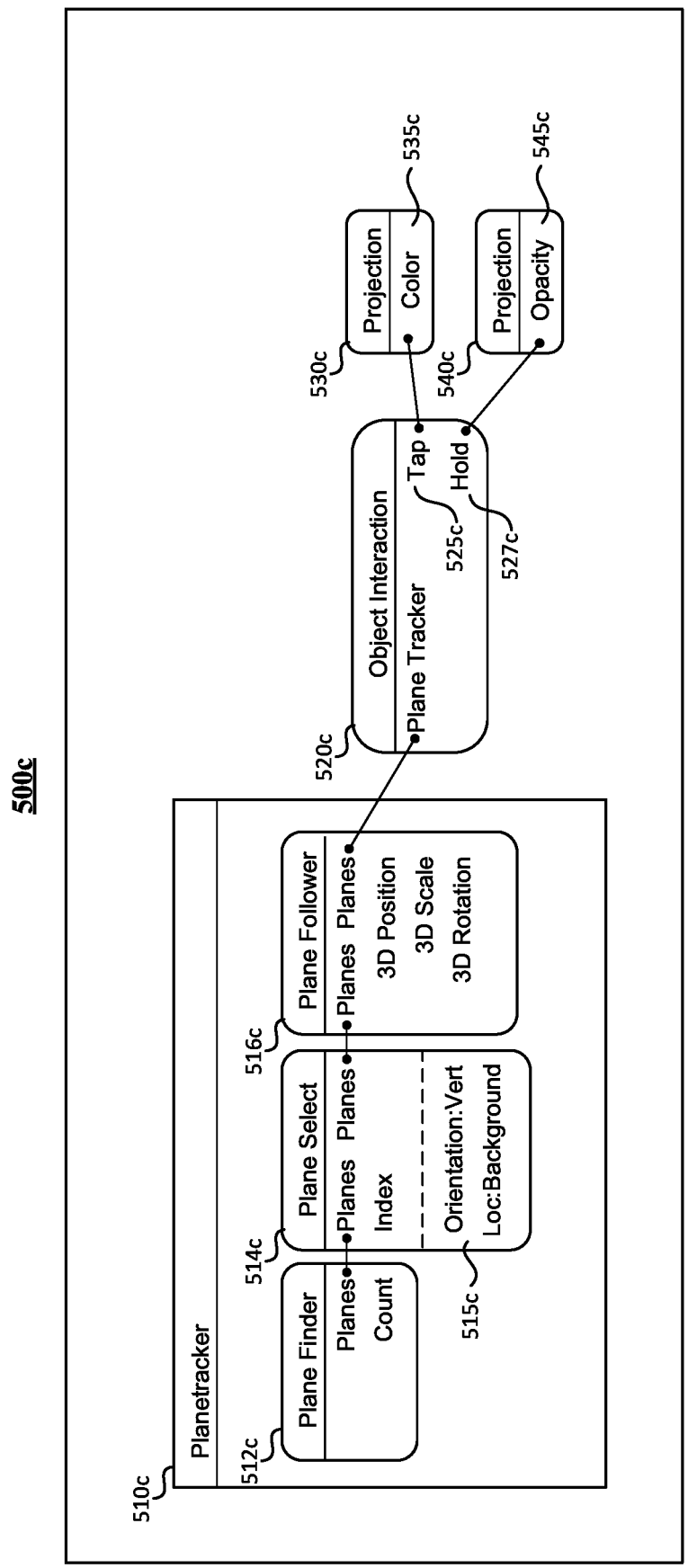

FIG. 5C illustrates a scene graph 500*c* corresponding to an augmented-reality effect wherein gestures detected in association with a plane object instance affect the color and opacity of an asset in the effect. The scene graph 500*c* comprises a collective node 510*c* labeled "Planetracker" that corresponds to a module for identifying and tracking the a vertical plane in the background of the scene. The collective node 510*c* further comprises a detector node 512*c*, a filter node 514*c*, and a data-acquisition node 516*c*. A module configured according to the detector node 512*c* labeled "Plane Finder" will identify all suitable planes in the scene. The module will send the collection of plane object instances to a module configured according to the filter node 514*c* labeled "Plane Select." As the selection criteria 515*c* of the filter node 514*c* indicates, a module configured according to the filter node 514*c* will select vertical planes in the background of the scene. These selected instances will then be sent to the module configured according to the data-acquisition node 516*c*. The module configured according to the data-acquisition node 516*c* will be configured to collect information including the three-dimensional position, three-dimensional scale, and three-dimensional rotation and send the collected information to other modules involved in the creation of the augmented-reality effect.

In particular, the module configured according to the data-acquisition node 516*c* will send the collected information to a module configured according to the intermediary node 520*c* labeled "Object Interaction." The intermediary node 520*c* corresponds to a module for detecting interactions with the plane instances of interest. As the metadata of the intermediary node 520*c* indicates, a module configured according to the intermediary node 520*c* will receive the collected information from a plane tracking module or collection of modules and detect whether a user has interacted with a device providing the augmented-reality effect to interact with one of the tracked plane object instances. According to the metadata 525*c*, if a tap interaction is detected, one or more properties of the asset node 530*c* are modified. The asset node 530*c* labeled "Projection" may correspond to a virtual object rendered in association with the tapped plane object instance by a rendering engine as a component of a virtual-reality effect. For example, the tracked plane object instances may be treated like wall posters of a basketball player and the augmented-reality effect may comprise projecting the player into the scene. In this example, the "Color" property shown within the metadata 535*c* of the asset node 530*c* is modified each time a module configured according to the intermediary node 520*c* detects the tap interaction. This may have the effect of changing the color of the jersey worn by the player. Additionally, according to the metadata 527*c*, if a hold interaction is detected, the opacity property 545*c* of the asset 540*c* is modified. one or more properties of the asset node 540*c* are modified. The asset node 540*c* labeled "Projection" may correspond to a different virtual object than that associated with asset node 530*c*. Continuing with the example from above, the "Opacity" property shown within the metadata 545c of the asset node 540c is modified each time a module configured according to the intermediary node 520c detects the hold interaction. This may have the effect of changing the opacity of a background image rendered behind the basketball player.

Figure 5D:
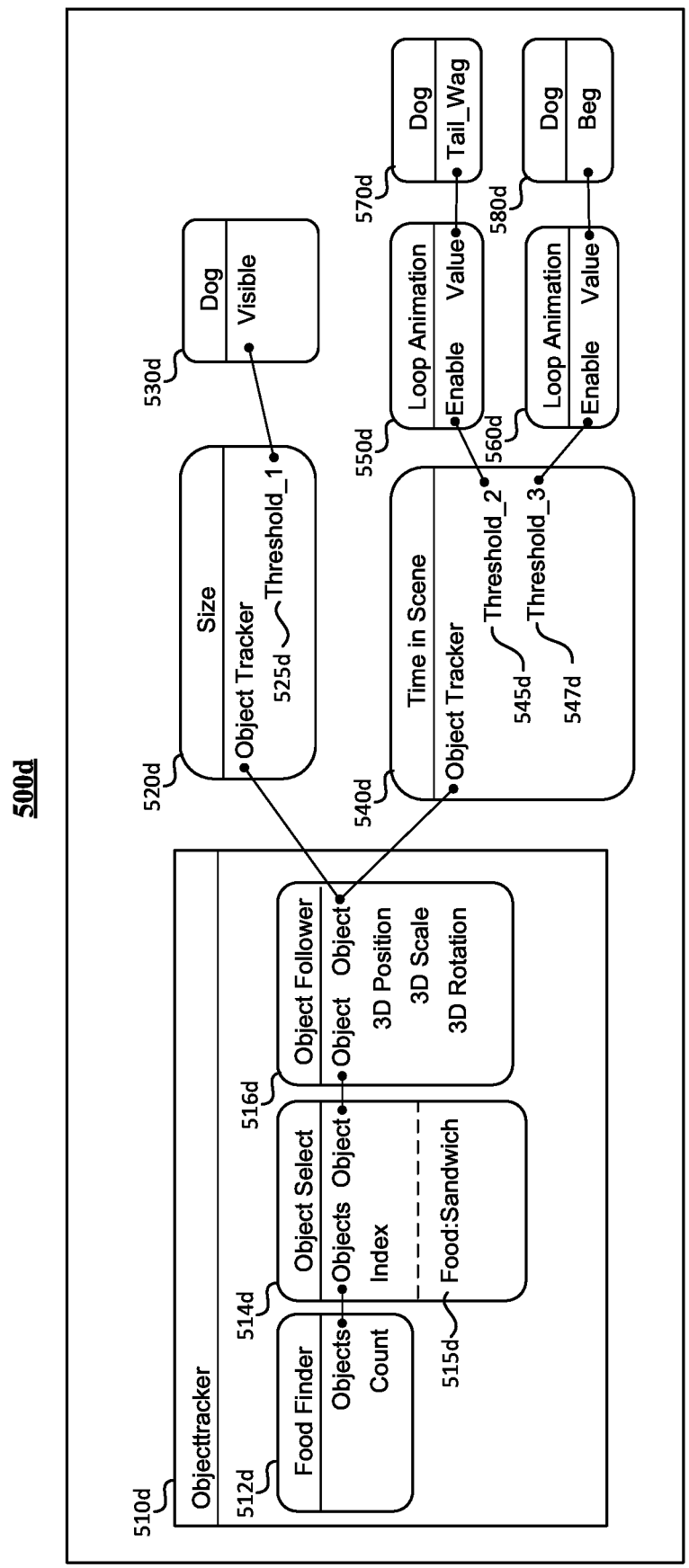

FIG. 5D illustrates a scene graph 500d corresponding to an augmented-reality effect wherein the presence of an object detected in a scene will cause the appearance and animation of a dog effect. The scene graph 500d comprises a collective node 510d labeled "Objecttracker" that corresponds to a module for identifying and tracking a hamburger object instance in the scene. The collective node 510d further comprises a detector node 512d, a filter node 514d, and a data-acquisition node 516d. A module configured according to the detector node 512d labeled "Food Finder" will identify all food object instances in the scene. This detection may be based on a reference library of food images using machine learning and computer vision techniques. The module will send the collection of food object instances to a module configured according to the filter node 514d labeled "Object Select." As the selection criteria 515d of the filter node 514d indicates, a module configured according to the filter node 514d will select object instances that it recognizes as sandwiches in the scene. This selected object instance will then be sent to the module configured according to the data-acquisition node 516d. The module configured according to the data-acquisition node 516d will be configured to collect information including the three-dimensional position, three-dimensional scale, and three-dimensional rotation and send the collected information to other modules involved in the creation of the augmented-reality effect.

In particular, the module configured according to the data-acquisition node 516d will send the collected information to a module configured according to the intermediary node 520d labeled "Size." The intermediary node 520d corresponds to a module for detecting whether the size of a tracked object satisfies a set threshold as indicated by the metadata 525d. A module configured according to the intermediary node 520d will receive the collected information from an object tracking module or collection of modules and detect whether the object instance has satisfied a threshold size. The size threshold may be set by the user through user input received as interactions with a user interface. If the size satisfies the threshold, one or more properties of the asset node 530d are modified. The asset node 530d labeled "Dog" may correspond to a virtual dog object rendered in the scene by a rendering engine as a component of a virtual-reality effect. In this example, the "Visible" property shown within the metadata 530d of the asset node 530d is switched on after a module configured according to the intermediary node 520d detects that the size threshold is satisfied. In this example augmented-reality effect, if the size of the sandwich is large enough, a dog will appear in the scene. Additionally, the scene graph 500d indicates that the module configured according to the data-acquisition node 516d will send the collected information to a module configured according to the intermediary node 540d labeled "Time in Scene." The intermediary node 540d corresponds to a module for detecting how long the object has been in the scene, and whether that time satisfies one or more thresholds. This value may be determined by the module configured according to the intermediary node implicitly (i.e., by determining whether the object has had a non-zero position or scale) or explicitly (i.e., the module configured according to the data-acquisition node sends collects information regarding the "existence" of the object instance). As the metadata 545d of the intermediary node 540d indicates, a module configured according to the intermediary node 540d will receive the collected information from an object tracking module or collection of modules and detect whether the object instance has been in the scene for an amount of time satisfying a first time threshold "Threshold_2," 545d. In this example, if threshold 545d is satisfied, a trigger is sent to the intermediary node 550d labeled "Loop Animation," causing a module corresponding to intermediary node 550d to enable an animation indicated by the asset node 570d associated with the dog asset including the property Tail_Wag. This may have the effect of causing the dog's tail to wag in the scene. If the module corresponding to the intermediary node 540d determines that the object has been in the scene for an amount of time satisfying a second time threshold "Threshold_3," 547d, a trigger is sent to intermediary node 560d labeled "Loop Animation." In this example, the intermediary node 560d will cause a module corresponding to intermediary node 550d to enable an animation indicated by the asset node 580d associated with the dog asset including the property Beg. This may have the effect of causing the dog to beg in the scene if the sandwich has been in the scene for an additional amount of time.

Figure 6A:
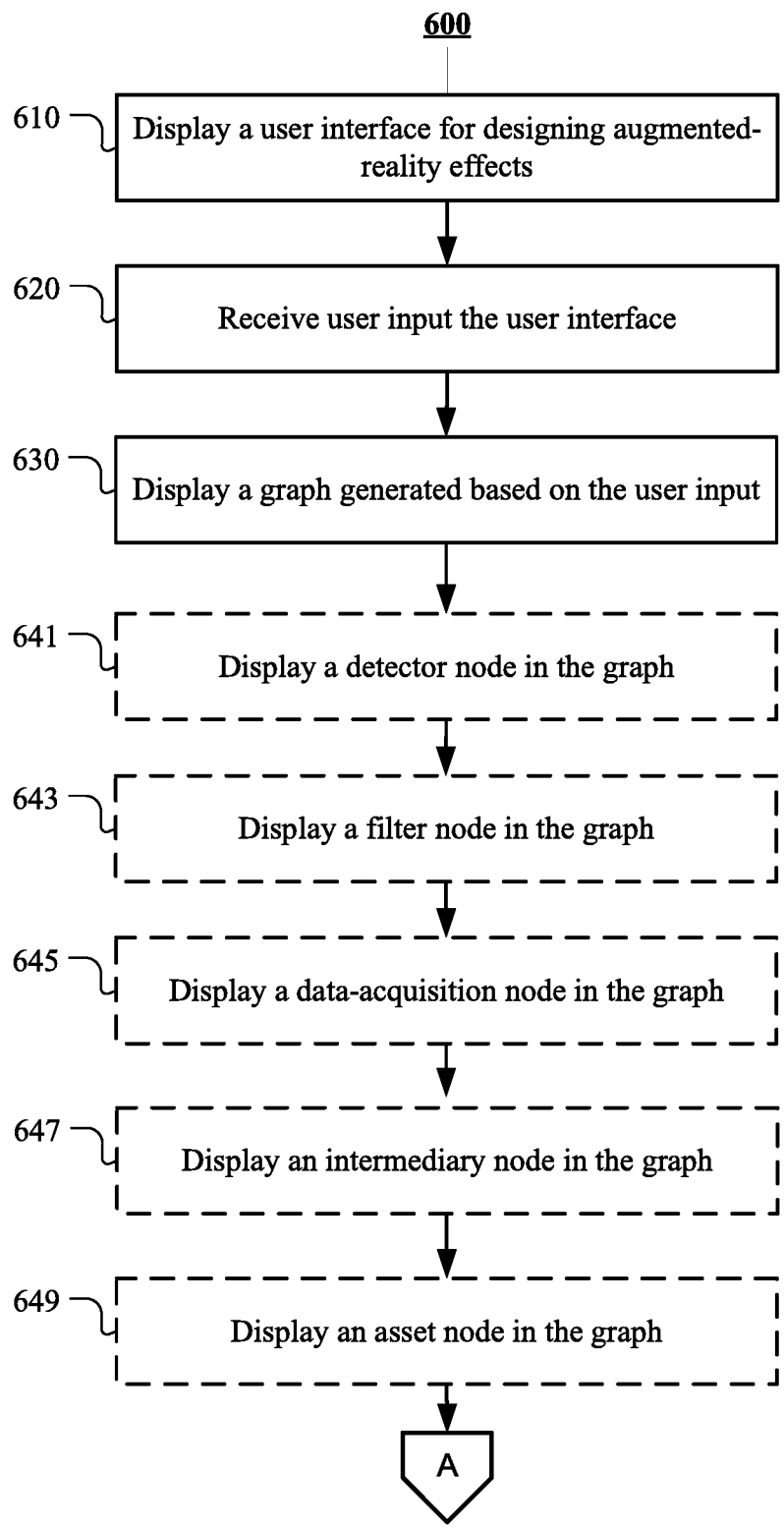
FIGS. 6A-6B illustrate an example method for rendering an augmented-reality effect based on a graph.

FIG. 6A illustrates an example method 600 for rendering an augmented-reality effect based on a graph. The method may begin at step 610, where a computing device displays a user interface for designing an augmented-reality effect. In particular embodiments, the user interface may be a user interface 100 of an integrated design environment. In particular embodiments, the user interface may be a standalone user interface. At step 620, the computing device may receive user input through the user interface. In particular embodiments, the computing device may receive the user input through interactions with the computing device or one or more peripheral devices associated with the computing device. At step 630, the computing device may display, in the user interface, a graph generated based on the received user input. The graph may comprise a plurality of nodes and one or more edges between nodes. Optionally, at step 641, the computing device may display a detector node and associated metadata in the graph. The detector node may allow a user to configure an augmented-reality system to identify object instances of a specified type in a scene in accordance with the detector node. Optionally, at step 643, the computing device may display a filter node and associated metadata in the graph. The associated metadata may comprise selection criteria associated with the filter node. The filter node may allow a user to configure an augmented-reality system to select instances of objects detected in the scene. The selection may be in accordance with the selection criteria. Optionally, at step 645, the computing device may display a data-acquisition node and associated metadata in the graph. The data-acquisition node may allow a user to configure an augmented-reality system to collect information about selected instances of objects detected in the scene. Optionally, at step 647, the computing device may display an intermediary node and associated metadata in the graph. The intermediary node may allow a user to configure an augmented-reality system to detect, create, or control interactions with the scene or objects in the scene. Optionally, at step 649, the computing device may display an asset node and associated metadata in the graph. The asset node may allow a user to configure an asset and its properties used in the augmented-reality effect.

Figure 6B:
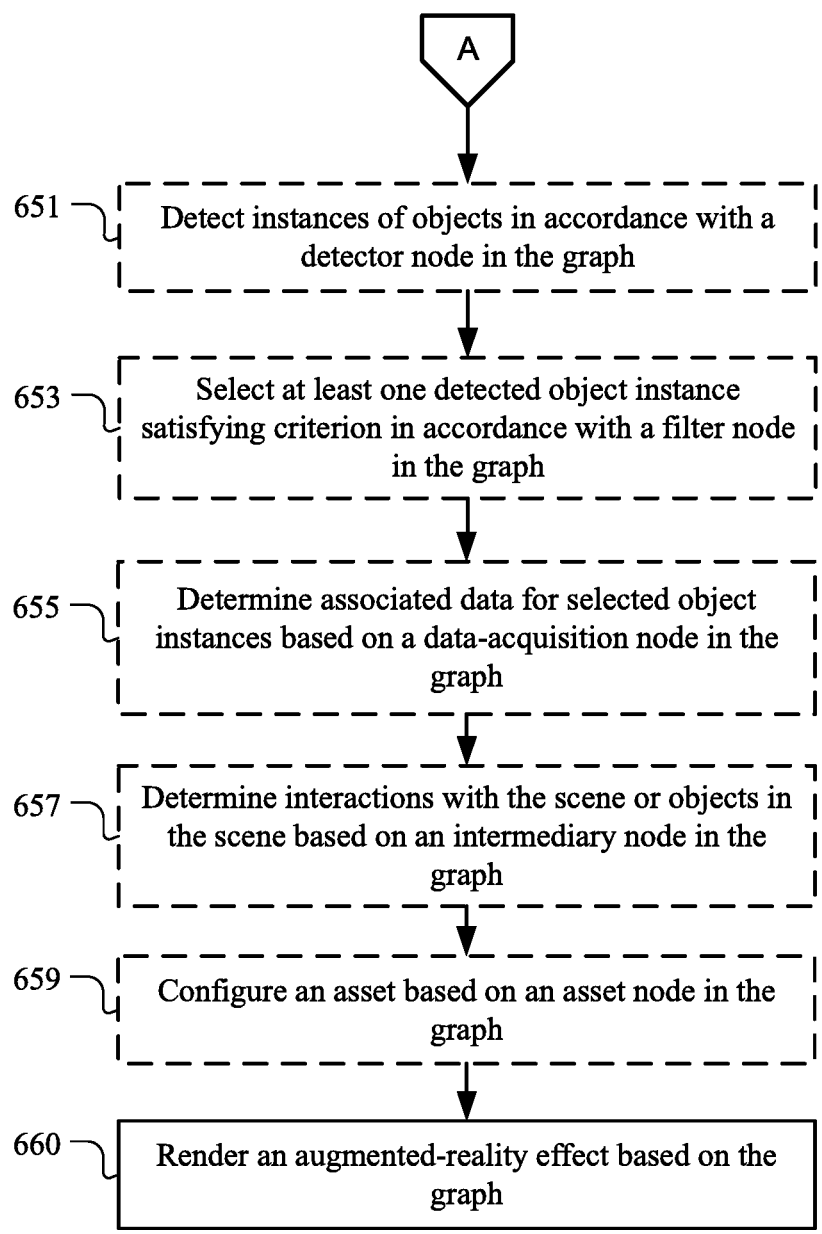

FIG. 6B continues the illustration of an example method 600 for rendering an augmented-reality effect based on a graph. Optionally, at step 651, the computing device may detect object instances of a type in accordance with a detector node in the graph. In particular embodiments, the computing device may configure a module of an augmented-reality system in accordance with a detector node in the graph. In particular embodiments, the computing device may use the metadata associated with the detector node to set parameters for the behavior of a detector module. As an example, the detector module may be configured to detect a specified type of object or a specified number of objects. Optionally, at step 653, the computing device may select one or more detected object instances in accordance with at least one criterion specified by a filter node in the graph. In particular embodiments, the computing device may configure a module of an augmented-reality system in accordance with a filter node in the graph. In particular embodiments, the computing device may use the metadata associated with the filter node to set parameters for the behavior of a filter module. As an example, the filter module may be configured use selection criteria to select detected object instances of interest. Optionally, at step 655, the computing device may determine associated data for one or more selected object instances based on a data-acquisition node in the graph. In particular embodiments, the computing device may configure a module of an augmented-reality system based on a data-acquisition node in the graph. In particular embodiments, the computing device may use metadata associated with the data-acquisition node to set parameters for the behavior of a data-acquisition module. As an example, the data-acquisition module may be configured to track the properties of selected object instances as the object instances or the scene change over time. Optionally, at step 657, the computing device may determine interactions with the scene or objects in the scene based on an intermediary node in the graph. In particular embodiments, the computing device may configure a module of an augmented-reality system based on an intermediary node in the graph. In particular embodiments, the computing device may use metadata associated with the intermediary node to set parameters for the behavior of an intermediary module. As an example, the intermediary module may be configured to detect interactions with the augmented-reality scene or the augmented-reality effect. Optionally, at step 659, the computing device may configure an asset of an augmented-reality effect based on an asset node in the graph. In particular embodiments, the computing device may use metadata associated with the asset node to set properties or the behavior of an asset. As an example, the appearance of the asset may be configured based on the metadata. At step 660, the computing device may render an augmented-reality effect. In particular embodiments, the augmented-reality effect may be rendered based on modules configured based on the graph.

Particular embodiments may repeat one or more steps of the method of FIGS. 6A-6B, where appropriate. Although this disclosure describes and illustrates particular steps of the method of FIGS. 6A-6B as occurring in a particular order, this disclosure contemplates any suitable steps of the method of FIGS. 6A-6B occurring in any suitable order. Moreover, although this disclosure describes and illustrates an example method for rendering an augmented-reality effect based on a graph including the particular steps of the method of FIGS. 6A-6B, this disclosure contemplates any suitable method for rendering an augmented-reality effect based on a graph including any suitable steps, which may include all, some, or none of the steps of the method of FIGS. 6A-6B, where appropriate. Furthermore, although this disclosure describes and illustrates particular components, devices, or systems carrying out particular steps of the method of FIGS. 6A-6B, this disclosure contemplates any suitable combination of any suitable components, devices, or systems carrying out any suitable steps of the method of FIGS. 6A-6B.

Figure 7:
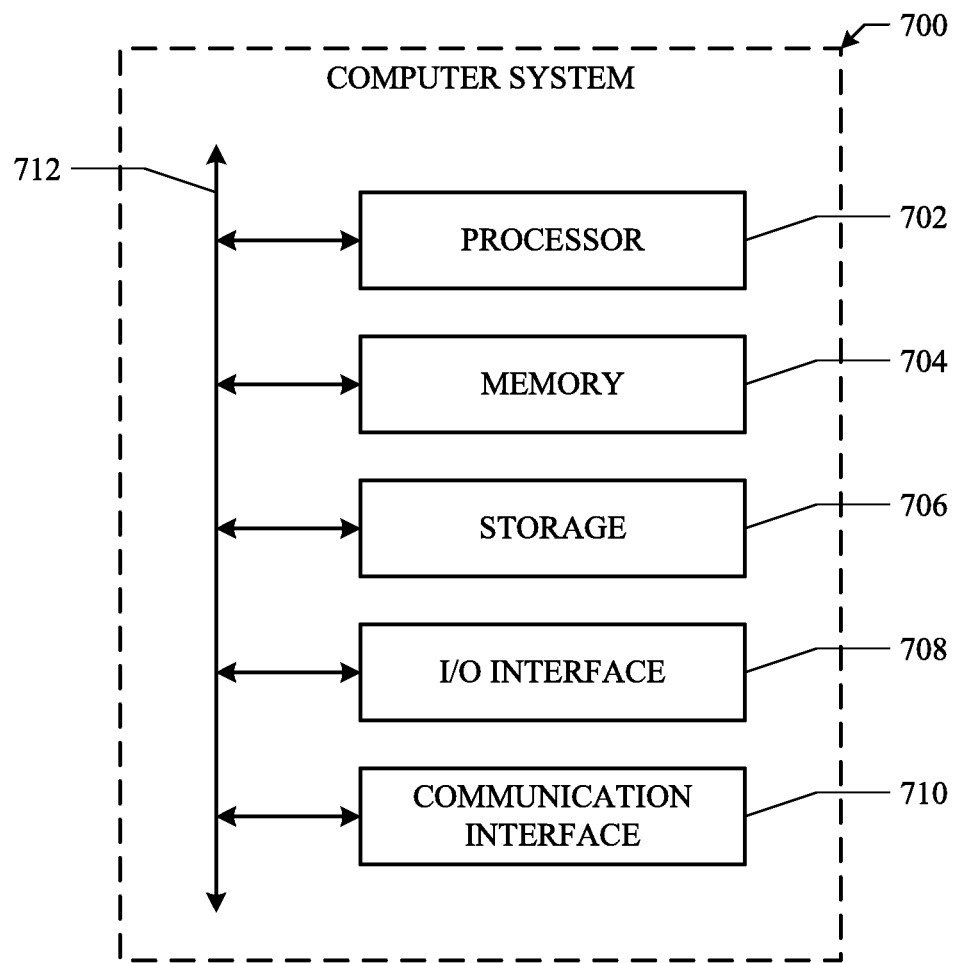
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, displaying a user interface for designing augmented-reality effects;
   by the computing device, receiving user input through the user interface;
   by the computing device, displaying, in the user interface, a graph generated based on the user input, the graph comprising a plurality of nodes and one or more edges, wherein the nodes comprise a detector node a filter node, and an asset node, wherein the detector node and the filter node are connected by one or more of the one or more edges and the filter node and the asset node are connected by another one or more of the one or more edges, wherein:
      the detector node corresponds to an object type for an object appearing in a real-world scene,
      the filter node corresponds to at least one criterion for selecting a subset of object instances detected in accordance with the detector node, and
      the asset node corresponds to computer-generated assets for use with an augmented-reality effect;
   by the computing device, detecting, in accordance with the object type corresponding to the detector node, one or more object instances of the object type appearing in a real-world scene;
   by the computing device, selecting, in accordance with the at least one criterion corresponding to the filter node, at least one of the one or more detected object instances that satisfies the criterion; and
   by the computing device, rendering an augmented-reality effect of the augmented-reality effects based on at least the selected object instance, the augmented-reality effect comprising at least the computer-generated assets corresponding to the asset node.

2. The method of claim 1, wherein the nodes of the graph further comprise a data-acquisition node that is connected to the filter node, the method further comprising:
   by the computing device, determining, based on the data-acquisition node, associated data for the selected object instance.

3. The method of claim 2, wherein the associated data determined for the selected object instance comprises one or more of:
   an absolute position;
   an orientation;
   a rotation; or
   a location of the selected object instance relative to a location of another object instance.

4. The method of claim 2, wherein the nodes of the graph further comprise an asset node that is connected to the data-acquisition node, and wherein rendering the augmented-reality effect based on the selected object instance comprises:
   by the computing device, rendering, based on the associated data determined for the selected object instance, an augmented-reality asset corresponding to the asset node.

5. The method of claim 1, wherein each edge of the one or more edges connecting a first node of the plurality of nodes to a second node of the plurality of nodes corresponds to a relationship between the first node and the second node.

6. The method of claim 5, wherein the relationship corresponding to at least one edge is a data dependency wherein an output associated with the first node is used as an input associated with the second node.

7. The method of claim 5, wherein the relationship corresponding to at least one edge is a sequential dependency wherein a first task associated with the first node is completed before a second task associated with the second node begins.

8. The method of claim 1, wherein the object type is specified by the user input received through the user interface.

9. The method of claim 1, wherein the object type is:
a face;
a hand;
a plane;
a two-dimensional shape; or
a three-dimensional volume.

10. The method of claim 1, wherein the at least one criterion corresponding to the filter node is specified by the user input received through the user interface.

11. The method of claim 1, wherein the at least one criterion corresponding to the filter node comprises one or more characteristics associated with the object type corresponding to the detector node.

12. The method of claim 1, wherein rendering the augmented-reality effect further comprises:
by the computing device, displaying, in the user interface, a viewport comprising the augmented-reality effect.

13. The method of claim 1, wherein the scene comprises media received from a capture device associated with the computing device.

14. The method of claim 1, further comprising:
by the computing device, displaying the rendered augmented-reality effect superimposed on a display of the scene.

15. The method of claim 1, further comprising:
by the computing device, generating instructions capable of being executed on other computing devices for performing actions in accordance with the graph.

16. One or more computer-readable non-transitory storage media embodying software that is operable when executed to:
display a user interface for designing augmented-reality effects;
receive user input through the user interface;
display, in the user interface, a graph generated based on the user input, the graph comprising a plurality of nodes and one or more edges, wherein the nodes comprise a detector node, a filter node, and an asset node, wherein the detector node and the filter node are connected by one or more of the one or more edges and the filter node and the asset node are connected by another one or more of the one or more edges, wherein:
the detector node corresponds to an object type for an object appearing in a real-world scene,
the filter node corresponds to at least one criterion for selecting a subset of object instances detected in accordance with the detector node, and
the asset node corresponds to computer-generated assets for use with an augmented-reality effect;
detect, in accordance with the object type corresponding to the detector node, one or more object instances of the object type appearing in a real-world scene;
select, in accordance with the at least one criterion corresponding to the filter node, at least one of the one or more detected object instances that satisfies the criterion; and
render an augmented-reality effect of the augmented-reality effects based on at least the selected object instance, the augmented-reality effect comprising at least the computer-generated assets corresponding to the asset node.

17. A system comprising:
one or more processors; and
one or more computer-readable non-transitory storage media coupled to one or more of the processors and comprising instructions operable when executed by one or more of the processors to cause the system to:
display a user interface for designing augmented-reality effects;
receive user input through the user interface;
display, in the user interface, a graph generated based on the user input, the graph comprising a plurality of nodes and one or more edges, wherein the nodes comprise a detector node, a filter node, and an asset node, wherein the detector node and the filter node are connected by one or more of the one or more edges and the filter node and the asset node are connected by another one or more of the one or more edges, wherein:
the detector node corresponds to an object type for an object appearing in a real-world scene,
the filter node corresponds to at least one criterion for selecting a subset of object instances detected in accordance with the detector node, and
the asset node corresponds to computer-generated assets for use with an augmented-reality effect;
detect, in accordance with the object type corresponding to the detector node, one or more object instances of the object type appearing in a real-world scene;
select, in accordance with the at least one criterion corresponding to the filter node, at least one of the one or more detected object instances that satisfies the criterion; and
render an augmented-reality effect of the augmented-reality effects based on at least the selected object instance, the augmented-reality effect comprising at least the computer-generated assets corresponding to the asset node.

* * * * *